United States Patent [19]

Spalding

[11] 4,325,475
[45] Apr. 20, 1982

[54] METHOD AND APPARATUS FOR STACKING

[75] Inventor: Michael H. Spalding, Green Bay, Wis.

[73] Assignee: Paper Converting Machine Company, Green Bay, Wis.

[21] Appl. No.: 152,044

[22] Filed: May 21, 1980

[51] Int. Cl.³ .............................................. B65G 57/09
[52] U.S. Cl. .................................. 198/429; 198/422; 198/812; 414/46; 414/78; 414/786
[58] Field of Search ...................... 414/29, 46, 69, 77, 414/78, 786; 198/422, 426, 427, 429, 812

[56] References Cited

U.S. PATENT DOCUMENTS

| | | | |
|---|---|---|---|
| 1,935,409 | 11/1933 | Mudd | 198/419 |
| 2,932,376 | 4/1960 | Millington | 198/812 X |
| 3,817,405 | 6/1974 | Neely | 414/78 X |
| 4,142,626 | 3/1979 | Bradley | 198/799 X |
| 4,164,997 | 8/1979 | Mueller | 198/427 |
| 4,231,470 | 11/1980 | Parkes | 198/812 X |

*Primary Examiner*—Leslie J. Paperner
*Attorney, Agent, or Firm*—Tilton, Fallon, Lungmus & Chestnut

[57] ABSTRACT

A method and apparatus for converting a stream of individual product such as diapers into predetermined count stacks and including a closed chain loop accumulator having differing speed input and output drives.

20 Claims, 6 Drawing Figures

METHOD AND APPARATUS FOR STACKING

BACKGROUND AND SUMMARY OF INVENTION

This invention relates to a method and apparatus for stacking and, more particularly to one providing full count stacks independent of supply.

Means for accumulating products to take up the difference between the rate of input and the rate of discharge are well known in the art—see, for example U.S. Pat. No. 4,142,626. Accumulators such as that in the '626 patent are arranged with separately driven input means so that they will only rotate as a function of incoming product, and likewise, the discharge end of the accumulating device is separately driven by a motor that is slave to downstream equipment. Accumulators described heretofore operate with a continuously driven input as long as upstream equipment is operating, and with continuous discharge as long as downstream equipment is operating. In the event that either upstream or downstream equipment stops, the chain loop configuration is changed to accept the differential. Accumulating devices to accept a continuous series of products, or an intermittent series of products at the infeed end and discharge a continuous series or intermittent but consecutive series of products at the discharge end are well known, but the invention is believed to be unique because of the intermittent motion at the discharge end which results in the unique ability to discharge a plurality of products—for example a 12 count stack of product, and further resides in the ability of the accumulating device to remain full while culling products (interrupting product flow to infeed), and still retain the ability to advance a full count stack to the discharge area in one or more steps.

Exemplary of the application of the invention is the production of disposable diapers—normally packaged by the dozen. These are produced on continuously operating machines which deliver diapers serially along a horizontal path—complete with fastening tabs. From time to time, a defective diaper may be delivered which has to be culled from the line before packaging. In the past, when this occurred, A "short count" stack was sensed and automatically diverted to a second delivery zone where operators counted the shortage, added an equal number of good diapers to complete the stack, and then manually packaged the now completed stacks, or manually transfer them to the normal packaging infeed conveyor. Although salvage and manual handling of short count stacks is justified, it is nonetheless highly labor-intensive and often disruptive to the normal packaging operation, thus thwarting the object of a high speed, automatic production line. This is avoided by the invention which is particularly well suited for installations where space is minimal and the product stream is temporarily interrupted.

The invention achieves these heretofore unavailable benefits. By providing a closed loop accumulator, serially introducing a product at a first point in the loop while periodically removing a product stack adjacent a second point, expanding the upper portion of the loop between the first and second points while contracting the remaining portion—this being responsive to the introduction of the product. Thereafter when sufficient product has been accumulated, the upper portion is contracted for a period to position a predetermined count of product in position for removal. After periodic contraction, the stack is removed—this while the continued inflow of product causes expansion of the upper loop portion. The invention is embodied in apparatus which has four sprocket means arranged in quadrilateral fashion, two of which are translatable and two are fixed in space so that the expansion and contraction of the loop portion is efficiently achieved between the receiving and delivery points.

Other objects and advantages of the invention may be seen in the details of the ensuing specification.

DETAILED DESCRIPTION

The invention is described in conjunction with an illustrative embodiment in the accompanying drawing, in which.

In the description, the word periodic is used to define a delivery sequence that operates for a period of time and then stops for a non-operative period of time, the operating/non-operating modes occurring sequentially and consecutively. Periodic and intermittent are used interchangeably.

Figure 1:
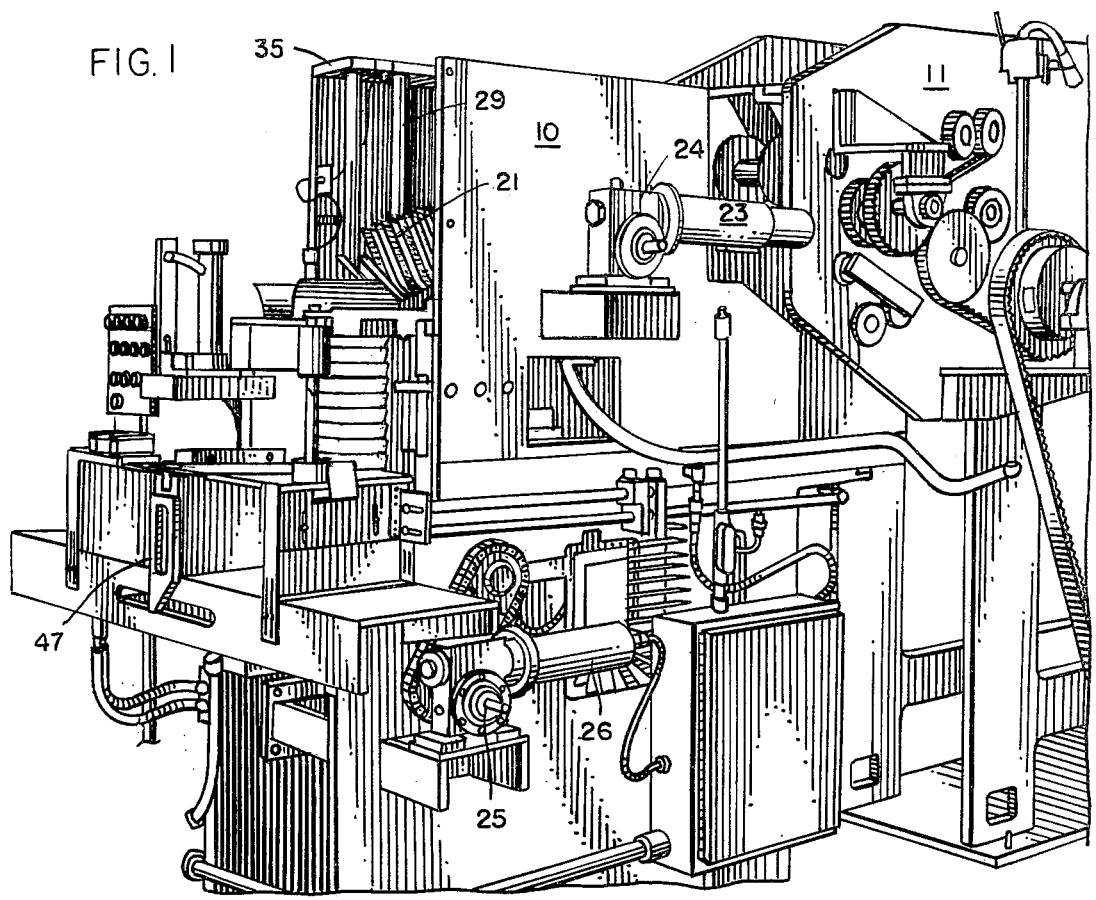
FIG. 1 is a fragmentary perspective view of apparatus embodying teachings of the invention.

In the illustration given, and with reference first to the FIG. 1, the numeral 10 designates the frame of the inventive apparatus which is seen to be positioned adjacent diaper forming apparatus designated 11. The frame 10 supports a closed loop accumulator generally designated 12 (see FIG. 5) which receives product serially from a belt delivery system 13—which in turn receives product (such as the diapers illustrated at D) from a cross-fold drum 14 provided as part of the diaper producing apparatus 11.

Figure 4:
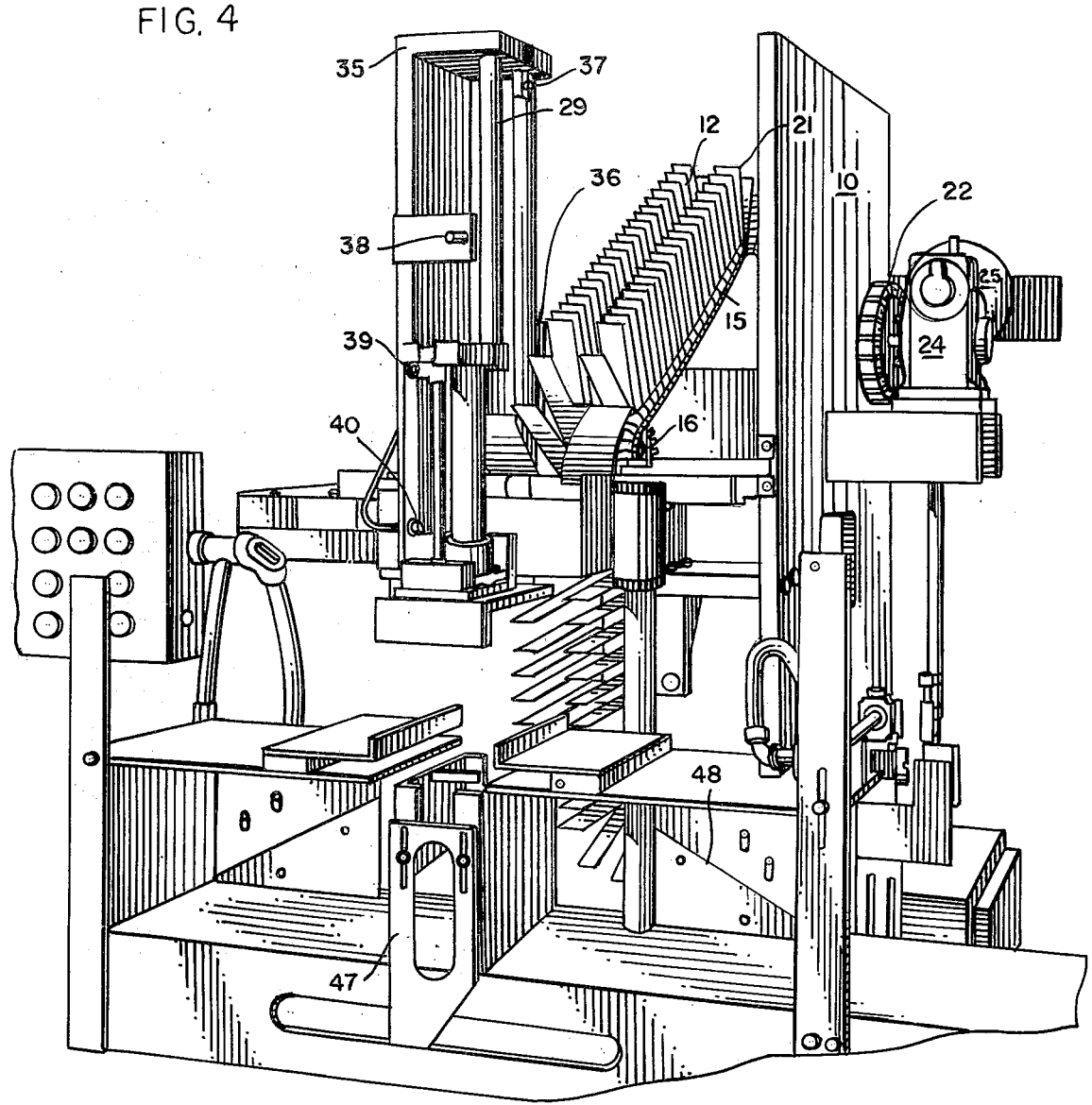
FIG. 4 is another perspective view of the apparatus of FIG. 1.

Referring next to FIG. 4, the chain loop accumulator 12 is seen positioned between the side frames making up the frame 10 and includes a pair of chains—one designated 15 in FIG. 4—each of which is entrained over four sprockets. In FIG. 4, for example, one sprocket can be seen at 16' and this corresponds to the dotted line position 16' of the sprocket 16 illustrated in FIG. 2.

Figure 2:
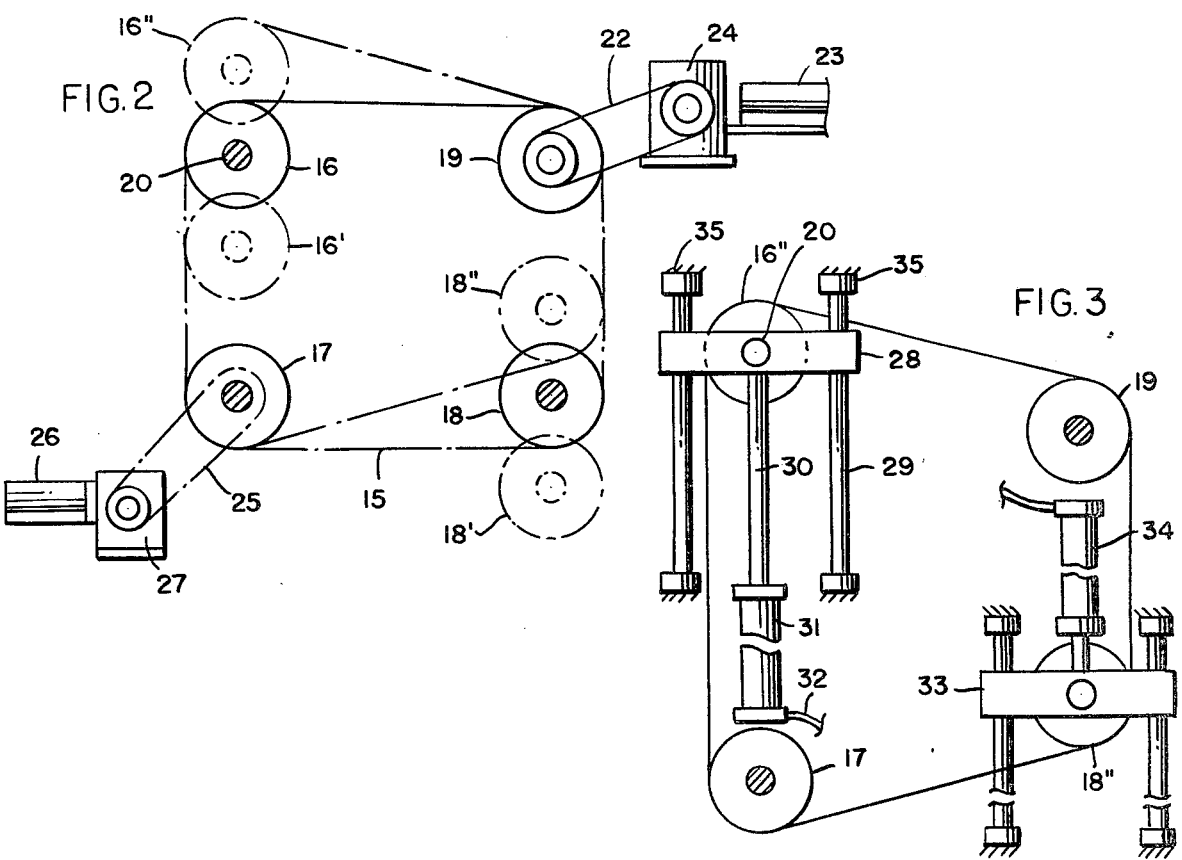
FIG. 2 is a schematic side elevation showing the quadrilateral arrangement of sprockets and the input and output drives.

In FIG. 2, the four sprockets arranged in quadrilateral fashion are illustrated as at 16, 17, 18 and 19. Corresponding sprockets are provided in horizontally spaced relation on a common sprocket shaft as at 20 relative to the sprocket 16. Supported between the chains associated with each set of sprockets are a plurality of finger means such as the plates 21 (designated in FIGS. 1, 4 and 5).

Referring again to FIG. 2, the stacking accumulating apparatus includes the four sprocket pairs 16-19 of which the sprockets 16 and 18 are mounted for translational, i.e., vertical as well as rotational movement. The sprockets 17 and 19 are fixed against translation and constitute the driven sprockets—the sprockets 16 and 18 being, in effect, idlers.

An input drive 22 provides rotational power to the sprocket 19 and includes a servomotor 23 operably associated with a gear box 24 coupled to the sprocket 19 by suitable roller chain and cooperating sprockets. Drive train 22 will cause continuous rotation of the sprocket pair 19 under normal circumstances when product is delivered serially and not being culled.

Stacker drive train 25 includes similar elements, i.e., a servomotor 26, gear box 27 and a roller chain arrangement to deliver rotational power to the sprocket 17. In the illustration given, servomotor 26 is cycled so that it operates about 50% of the time.

In FIG. 1, the positions of the sprockets designated by 16 and 18 represent a substantially central position of the movable sprockets.

The numeral 16', as stated previously represents the lower position of the sprocket 16. Correspondingly, the designation 16" designates the upper position of the sprocket 16. The sprocket pair 16 is thus vertically movable and allows the total number of products in transit or accumulation between the input sprocket 19 and the discharge sprocket 17 to change. Since the total length of the chain 15 in the loop around the sprockets 16-19 cannot change, upward movement of the sprocket pair 16 causes a greater proportion of the total chain length to be located in the upper run between sprockets 19 and 17 and, therefore, vertically movable sprocket pair 18 will move a like amount to decrease the length of chain in the lower loop between sprockets 17 and 19—this being generally inversely proportional to the increase in chain length in the upper portion of the loop between sprockets 19 and 17. Thus, when the sprocket 16 moves upwardly to the position 16", the sprocket 18 also moves upwardly to the position 18", and when the sprocket 16 moves to the lower position 16'—in effect, shortening the upper portion of the loop, the sprocket 18 moves to the position 18' thereby lengthening the lower portion of the chain loop 15.

Figure 3:
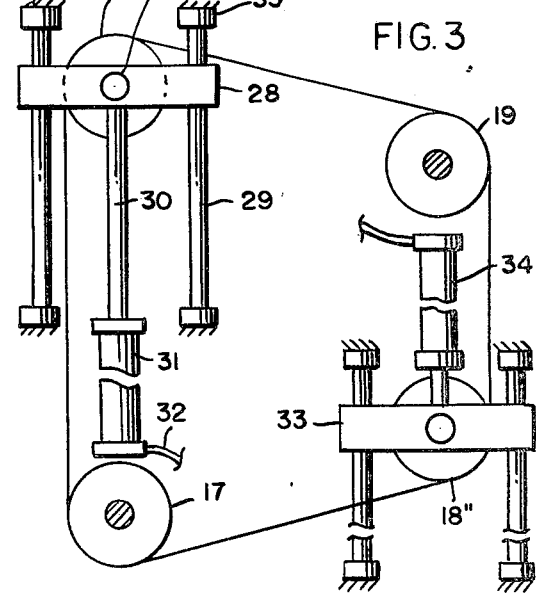
FIG. 3 is a view similar to FIG. 2 but with the input and output drives removed but showing mechanism for movement of certain of the sprockets.

FIG. 3 shows the general arrangement and mechanism used to achieve vertical movement of the above-mentioned sprocket pairs. This cooperating relationship does not alter the total length of the chain 15 wrapped around the plurality of spaced apart sprockets. In FIG. 3, the drive trains 22 and 25 have been eliminated for clarity of presentation, but the means for allowing vertical movement of the sprocket pairs 16 and 18 are shown. In the illustration given, the same means are provided generally for each of the movable sprocket pairs. Referring to the upper left hand portion of FIG. 3, it will be seen that the sprocket in the position 16" is supported on a carriage 28 from which the shaft 20 extends in horizontally cantilevered fashion. The carriage 28 is slidably mounted on a pair of vertical shafts 29 which also can be seen in FIGS. 1 and 4.

Referring again to FIG. 3, the carriage 28 is connected to the rod 30 of an air cylinder 31 fixed to the frame 10. An air inlet 32 is provided at the power end of the cylinder 31 and therefore exerts an upward urging action on the carriage 28. As a corollary, the sprocket pair 18 (evidenced by the sprocket designated 18" in the lower right hand portion of FIG. 3) is mounted on a similar bracket 33 but the cylinder 34 associated therewith is arranged to constantly urge the sprocket pair 18 downwardly, thereby yielding a force balanced chain loop and one that will automatically compensate movement of one sprocket pair with equal movement of the second sprocket pair in the same direction. Schematically represented in FIG. 3 is the attachment of the shafts 29 to the frame 10 at fixed points as at 35 which can be appreciated from the upper left hand portions of FIGS. 1 and 4.

Figure 5:
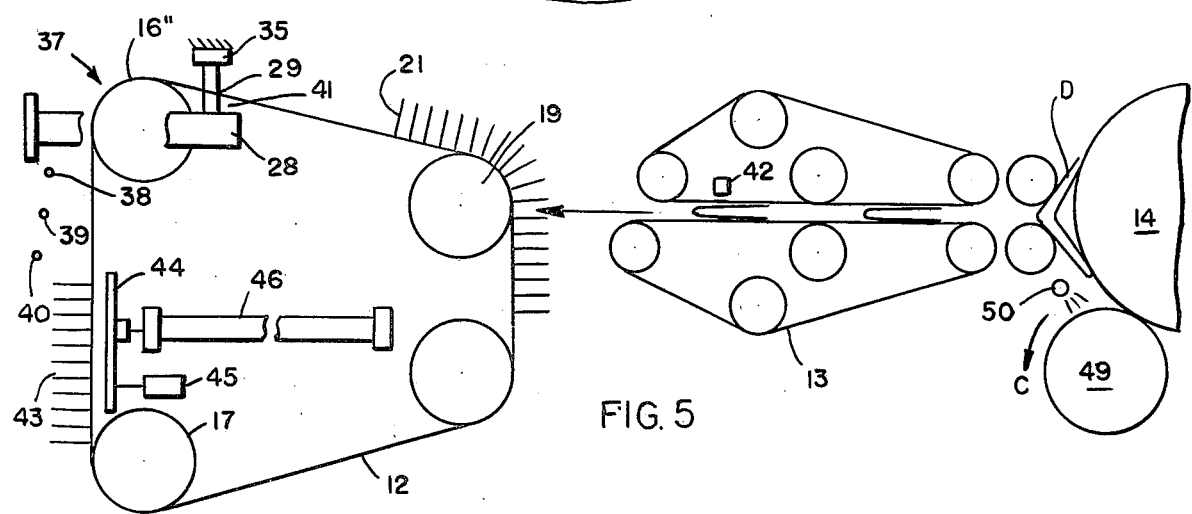
FIG. 5 is a schematic side elevational view of the apparatus showing the means for introducing product into the stacking mechanism and the means for periodically removing the same.

In FIG. 5, the drive trains 22 and 25 as well as the cylinder arrangements 31 and 34 of FIG. 3 have been eliminated for clarity, but control switches in a stack discharge means are shown. In addition, FIG. 5 shows portions of the product finger means 21 at the input station (adjacent sprocket 19 and in the stack discharge zone adjacent the sprocket 17). As the carriage 28 and the associated sprocket pair 16 (represented by the sprocket 16") move upwardly or downwardly, metal blades of different lengths attached to the carriage 28 actuate proximity switches. One such actuator blade is seen in the upper central portion of FIG. 4 and is designated by the numeral 36. The proximity switches (for controlling different functions) are mounted on the frame as at 37, 38 (proceeding downwardly in the upper left hand portion of FIG. 4), 39 and 40. These switches are depicted schematically at the left hand portion of FIG. 5. It will be understood that the length of the blades (as that at 36) and/or the positions of the coacting proximity switches 37–40 can be adapted to change the operating range of each "zone", and the location of the zone relative to a base reference point. For example, the placement of switch 37 is such that at the end of its effective zone, there is a clearance or gap 41 between the upwardly moving carriage 28 and the bracket or support 35 for the shafts 29. This gap allows approximately three or four additional products to be fed into the chain loop since several products are in transit beyond the cull station C (see the extreme right hand portion of FIG. 5) and will therefore cause continued upward movement of the sprocket pair 16 and its support 28 before the drive train 22 is interrupted. Additionally, the gap 41 is a precaution to keep the carriage 28 from contacting the upper support bracket 35.

NORMAL OPERATION

Still referring to FIG. 5, product (such as diapers) are serially fed through the belt system 13 and are delivered sequentially into pockets between the finger means 21. The sprocket 19 (via the drive train 22) is rotated continuously, the motor 23 being a servomotor which rotates one revolution for each product cycle of the machine.

In normal operation, circuitry and power to motor 23 is maintained as long as a continuous flow of product is sensed by photoeye 42 (operably associated with the delivery belt system 13). If product is culled, as at C in FIG. 5, photoeye 42 senses the absence of product and causes motor 23 to stop for the duration of the signal (absence of product)—cull mode being described in detail hereinafter.

As long as a continuous stream of good product is delivered to and transported by belt system 13, servomotor 23 continues to rotate one increment (one revolution) for each product, and through drive train 22, causes continuous motion of the infeed pocket (developed by the finger means 21) past the infeed position to receive the continuous stream of product for subsequent transport through the chain loop system 12. However, even with continuous infeed, the chain loop system 15 between the sprocket pairs 17 and 19, changes length in periodic fashion due to the intermittent function of the motor 26 and the periodic presentation of multiple products to the delivery zone 43 (see the left hand portion of FIG. 5). As the finger means 21 rotate around the sprocket 19, the pockets open up at the periphery since the finger means extend radially from the center of the sprocket 19.

To advance pluralities of accumulated products into discharge zone 43, motor 26 rotates intermittently about 50% of the time.

Figure 6:
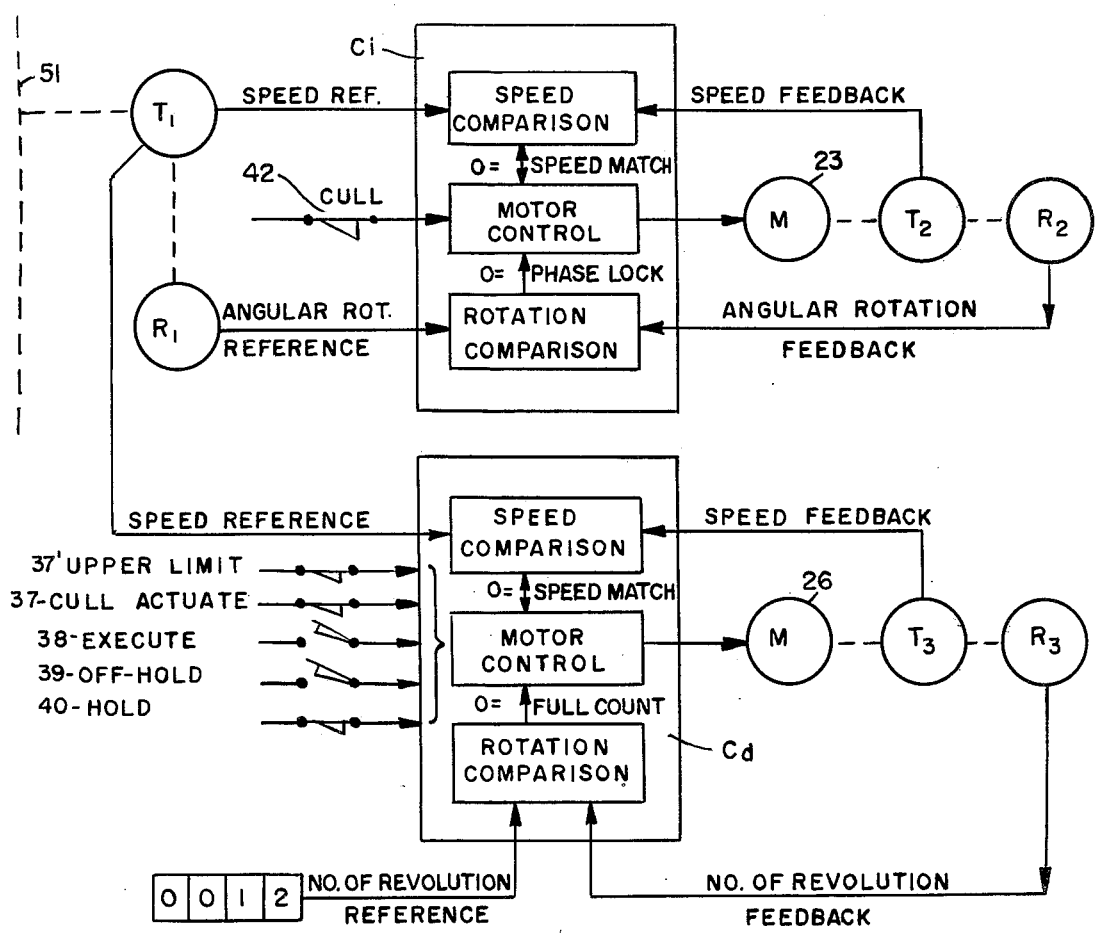
FIG. 6 is a simplified diagram of the electrical control functions.

For each revolution of motor 26, a feedback signal is sent to master controller $C_d$ of FIG. 6, and when the sum of motor revolutions is equal to the predetermined and preset count reference in the master controller, the controller deenergizes the power circuit to motor 26 in readings for the stack discharge function.

For example, in order to discharge a full count stack of 12 product, motor 26 will turn 12 revolutions to bring 12 chain "pockets" and 12 products into stack discharge zone 43 and will then be controlled to pause and remain non-operative long enough to permit pusher 44 to remove the stack by passing between the spaced apart finger means 21—see FIG. 4.

After the pusher 44 has been retracted so as to contact limit switch 45, motor 26 will be energized and will rotate to advance a next plurality of 12 product into the discharge zone 43.

Two conditions are necessary to initiate the chain advance discharge action. First, the pusher 44 (moved by the air cylinder 46 fixed to the frame 10) must make a full stroke and return to engage limit switch 45 indicating that the discharge zone 43 is free to accept the next stack. Second, the carriage 28 must have actuated switch 38 indicating that under normal circumstances when a continuous non-interrupted flow of product is entering the chain loop, there is sufficient chain accumulated in the upper span between sprockets 19 and 17 to permit a full count plurality of chain pockets to be brought to the discharge zone in one continuous operation (12 revolutions) of motor 26.

This portion of the cycle can be interrupted by the actuation of switch 40 which indicates that the accumulated product in the upper chain portion between sprockets 19 and 17 is depleted. Actuation of switch 40 places motor 26 on "hold", causing it to cease rotation and thus deactivate the discharge cycle but holds the motor 26 in readiness to start again when the upper portion of the chain loop has expanded. Rotation of the motor 23 (at the input end) is maintained by a subsequent influx of product and therefore will restore accumulated product in the "contracted" upper chain loop portion between the sprockets 19 and 17. When sufficient chain is accumulated to cause the carriage 28 to rise to the zone controlled by the switch 39 and actuating that proximity switch, motor 26 is taken off "hold", and circuitry is reestablished to permit rotation of motor 26 to bring the full count stack to the discharge zone. During the "hold" mode, the cumulative product in the chain loop is increasing as long as there is a continuous influx of product at the infeed position adjacent sprocket 19.

Under normal circumstances and with a noninterrupted continuous influx of products, it will be recognized that the chain loop expands sufficiently to insure that a full product stack can be delivered during the on cycle of motor 26.

The operation of the pusher 44 delivers a full count stack into the position occupied in the lower central portion of FIG. 4 by the side shifter 47—by passing between the spaced apart finger means 21. Thereafter, the side shifter 47 moves horizontally in alternate directions to shift a first stack to one side and then the next stack to the other. After two complete stacks, i.e., two stacks, each with one dozen products, have been accumulated, the delivery rams on each side (as at 48) move forwardly to deliver the two stacks to the cartoning zone (not shown).

CULL MODE OPERATION

Referring again to FIG. 5 and to the lower right hand portion, as a product is being delivered between the folding drum 14 and the knife roll 49, it can be diverted into the cull zone C by actuation of an air blast as at 50. Thus, when a product is being culled, product influx is interrupted and the expanded chain loop may not have a sufficient number of products, i.e., be too short in length, to guarantee that a full count can be pulled downwardly by the motor 26 into the discharge zone 43. The placement of the proximity switches and the circuitry is such that while culling, motor 26 can turn less than 12 revulutions during the "on" cycle and, if it contacts switch 40 before it completes 12 revolutions (depleting the accumulated loop of products), it will pause until more product is introduced and the chain loop expands until upwardly moving carriage 28 engages switch 39—this allowing further revolutions of the motor 26. Thus, the motor 26 can actuate several times before it has delivered a full 12 count stack to the delivery zone 43. When the total number of revolutions of motor 26 corresponds to the preset stack count (12 as illustrated), the discharge controller $C_d$ holds the motor 26 "in-position" until actuation of the cylinder 46 and movement of the pusher 44 causes discharge of a full count stack of product. Motor 26 remains non-operative until pusher 44 returns to actuate switch 45 and this fulfills one of the two above mentioned prerequisite conditions for actuating motor 26 and beginning a new discharge cycle.

Prior to each discharge cycle actuation, sufficient product is introduced at the infeed position adjacent sprocket 19, causing the chain loop to expand and the movable carriage 28 to move upwardly until a blade attached to the carriage 28 actuates switch 38, thus satisfying the second condition necessary for the start of the new chain advance to discharge zone 43. The master controller associated with the motor 26 permits this motor to rotate and begins to count revolutions of the motor 26 until the predetermined full count number of revolutions is satisfied—then the controller deenergizes motor 26 until the stack is discharged and the two necessary conditions are again fulfilled before the next cycle.

PROTECTIVE CONTROL FUNCTIONS

It will be appreciated that the carriage 28 moves upwardly with continuous product infeed and when the motor 26 is not operating, malfunction of downstream packaging equipment will cause extended deenergizing of motor 26. With continued input of new product, the upper portion of the chain loop continues to expand and the movable support moves past the "execute" switch 38 toward the upper stop or support bracket 35. The continued upward motion of the movable sprocket pairs could cause loss of chain loop tension control with the potential of erratic filling or jamming of the product in the pockets at the input position. To prevent this condition, the switch 37 initiates actuation of the cull mode. An additional switch (see 37' in FIG. 6) above switch 37 can be advantageously provided near the top limit of travel of the carriage 28 to prevent the carriage 28 from actually contacting the bracket 35.

When the downstream packaging equipment (not shown) begins operating, the control circuitry permits motor 26 to rotate and the system is returned to the normal operation described above. In fashion similar to the function provided by switch 37, the switch 40 prevents contact of the downwardly moving carriage with the lower stop provided by the support for the shaft 29.

CONTROL SCHEMATIC

The upper portion of FIG. 6 shows the basic control functions of the infeed controller $C_i$ and its coacting relationship with the infeed drive motor 23. A cull switch activated by photoeye 42 is also shown, as it affects the motor control. In the bottom part of FIG. 6, various control functions are shown schematically in the discharge controller $C_d$ as they affect motor control for the stacking discharge motor 26. Limit switches 37, 37', 38, 39 and 40 are also shown as they relate to control of the stacking motor 26. The controllers and servomotors are commercially available from Control Systems Research, Inc. of Pittsburgh, Pa.

On the left side of FIG. 6, the dotted line 51 represents a machine line shaft connected mechanically (viz., by dotted line also) to a speed reference tachometer $T_1$ and a resolver $R_1$ (for angular rotation reference). These send signals to comparator circuits within the controller $C_i$. In like manner, feedback signals from a motor driven tachometer $T_2$ and resolver $R_2$ are also fed back and compared with the base reference. When the difference between these signals reaches "0", speed match occurs. That is, sprocket pair 19 is driven at a speed that presents one pocket for each machine revolution (and each product). The reference resolver $R_1$ and feedback resolver $R_2$ each provide signals to a rotation comparator in the controller $C_i$ and when the difference between these signals is "0", the proper phase relationship is established. In essence, the resolvers keep track of the position of each diaper during one machine revolution—it being recognized that during one complete machine revolution, a diaper will move a predetermined distance through several processing steps. The resolvers are used to detect and to keep track of the exact position of the diaper, since its exact position must be known, especially for functions such as diaper entry into pockets between finger means 21—it being noted that this important relationship is maintained without any mechanical connections.

The infeed control system (upper half of FIG. 6) schematically shows a normally closed "cull" switch 42. As long as switch 42 is closed, motor 23 will be powered, but when culling occurs, the power circuit is interrupted and input motor 23 is deenergized.

In like manner, the basic machine speed reference from $T_1$ is compared with the discharge feedback $T_3$. In this instance, the discharge speed is not equal to machine speed, but will be proportional. The speed of stacking drive motor 26 is equal to at least twice the speed of infeed motor 23, however, both motors will operate at less than their full speed rating when the process machine is being run at slow speed.

At the lower left, a preset digital counter is set up for 12 count. Resolver $R_3$ is also mechanically driven from stacking drive motor 26 and provides a feedback signal indicating the number of revolutions that it has turned. This is compared with the preset reference and motor 26 will continue to operate until resolver $R_3$ indicates 12 revolutions, thus satisfying the full count demand of 12 products.

Limit switches 37' through 40 are connected to the motor power circuit. As the movable carriage 28 moves toward the upper frame brackets 35, the carriage will actuate switch 37 and the upstream cull system is activated. If for any reason the cull system malfunctions, another switch, 37', will shut the process machine down before the movable bracket 28 reaches the upper limit at 35. Switch 40 is normally closed, and under normal operation will not be engaged. If it is actuated, it deenergizes the power circuit and stops stack delivery motor 26. Actuation of switch 40 will occur when movable carriage 28 moves downwardly faster than it would under normal circumstances, and this occurs when the top expanded loop depletes rapidly as for example, when the processing machine is shut down, or when a diminished influx of product reaches the accumulator loop during culling. When switch 40 is actuated, it deenergizes motor 26, and when the movable bracket 28 moves upwardly (even at a diminished rate), the circuit involving switch 39 is energized. Switch 39 is contacted by the movable bracket 28, and motor 26 is energized to advance the additional pockets (and product) that have been introduced during the interval between actuation of switch 40 and switch 39—thus allowing motor 26 to complete a stack in two or more periods of being energized.

For example, if 6 diapers have been advanced to the delivery zone 43 when bracket 28 contacts switch 40, motor 26 will stop, carriage 28 will move upwardly (with a diminished supply at infeed), and for example, if three additional diapers are added between contact with switch 40 and switch 39, motor 26 will be re-energized, advance three pockets, etc., whereupon it will contact switch 40, be deenergized, and wait until movable bracket 28 again moves upwardly to contact switch 39. Motor 26 will again be energized and advance three additional pockets. Thus, in three separate periods of being energized, motor 26 will advance a total of 12 diapers into delivery zone 43 and thus satisfy the preset 12 count reference shown in digital counter. Since the total number of motor revolutions equals the preset count, the system is now in readiness to discharge the completed stacks as described hereinabove.

The apparatus is normally arranged to operate at at least 300 diapers/minute. At 360/minute, the accumulation is 6/second or 2 seconds per stack. This underscores the need for reliable operation. With the upper loop portion being filled at 6 products per second and with the discharge motor operating at twice that speed (for example), the upper or product-advancing loop portion is expanding during the first second and contracting during the second. Although the contraction is at twice the speed, the continuing influx of product returns the apparatus to initial position.

When a single diaper is culled, the apparatus has sufficient capacity in the vertical discharge leg to accommodate this—without interruption of the motor 26. However, the subsequent expansion will take proportionately longer to bring the carriage 28 back to position to trigger switch 38. The periodic contraction then starts again and, as soon as it is finished, the discharge controller $C_d$ delivers a signal to immediately energize the pusher 44. Of course, as this happens, the upper loop portion is already expanding because of the continuous introduction of product so time is used to maximum effectiveness.

While in the foregoing specification a detailed description of the invention has been set down for the purpose of illustration, many variations in the details hereingiven may be made by those skilled in the art without departing from the spirit and scope of the invention.

I claim:

1. In a method of providing stacks of predetermined count product, the steps of providing a closed loop accumulator, serially introducing product at a first point in said loop while periodically removing a product stack adjacent a second point to provide a product-advancing loop portion with said loop portion expanding due to product introduction and the remaining loop portion contracting, periodically contracting the advancing loop portion and immediately thereafter removing said product stack, said advancing loop portion being arranged to expand during stack removal due to further product introduction.

2. The method of claim 1 in which said loop is driven at a substantially uniform rate adjacent said first point, the contraction of said advancing loop portion being due to periodically driving said loop adjacent said second point at a rate faster than said uniform rate.

3. The method of claim 2 in which the initiation of said periodic driving is responsive to the extent of expansion of said advancing loop portion, the duration of said periodic driving being a function of said predetermined count.

4. The method of claim 3 in which said serial introduction is interrupted, said periodic contraction being responsive to the interruption.

5. The method of claim 4 in which either the initiation of periodic driving is delayed or the periodic driving itself stopped responsive to said interruption.

6. The method of claim 4 in which said introduction is interrupted as a function of the cessation of stack removal from said loop.

7. The method of claim 1 in which said advancing loop portion has a vertically descending leg, terminating adjacent said second point, the expansion of said advancing loop portion occurring at the upper leg end.

8. Apparatus for providing stacks of predetermined count product comprising a frame, a closed loop chain means accumulator mounted on said frame, means for serially introducing a product adjacent a first point in said loop and means for periodically removing a product stack adjacent a second point in said loop, means for driving said loop adjacent said first point at a substantially uniform rate and means for periodically driving said loop adjacent said second point at a rate faster than said uniform rate to expand one position of said loop while contracting the remaining portion, and means coordinating said periodic driving means and removal means to actuate the latter immediately after said periodic driving means has stopped and a predetermined count stack is available adjacent said second point for removal.

9. Apparatus for providing stacks of predetermined count product comprising a frame, a closed loop accumulator mounted on said frame, means for serially introducing a product adjacent a first point in said loop and means for periodically removing a product stack adjacent a second point in said loop, means for driving said loop adjacent said first point at a substantially uniform rate and means for periodically driving said loop adjacent said second point at a rate faster than said uniform rate, and means coordinating said periodic driving means and removal means to actuate the latter immediately after said periodic driving means has stopped and a predetermined count stack is available adjacent said second point for removal, said loop accumulator including a pair of spaced apart, parallel endless chains each entrained on four sprockets being mounted adjacent said first and second sprockets being mounted adjacent said first and second points with the remaining two sprockets being mounted on opposite sides of said first point sprocket and being translatable to achieve expansion of one loop portion while contracting the other.

10. The apparatus of claim 9 in which control means are operably associated with said frame for delaying or interrupting said periodic driving means responsive to interruption of said uniform driving means.

11. A product accumulator adapted to be interposed in the path of a series of products and to arrange the products in stack form for delivery to a second path comprising a frame interposed between the first mentioned and second paths, four sprocket means arranged in quadrilateral fashion on said frame and supporting a closed chain loop thereon, said chain loop being equipped with finger means for supporting products delivered thereto from said first mentioned path, a first of said sprocket means being positioned adjacent said first mentioned path and fixed against translational movement, means operably associated with said first sprocket means for rotating the same at a velocity corresponding to the velocity of product in said first mentioned path, a second of said sprocket means being also positioned adjacent said first mentioned path and mounted for translational movement so as to vary the distance between said first and second sprocket means, a third of said sprocket means positioned adjacent said second path and fixed against translational movement, means operably associated with said third sprocket means for periodically rotating the same, the fourth of said sprocket means also positioned adjacent said second path and mounted for translational movement so as to vary the distance between said third and fourth sprocket means in an inverse relation to the distance change between said first and second sprocket means, and means on said frame for delivering an accumulated stack of product from said chain loop to said second path.

12. The structure of claim 11 in which said frame has operably associated therewith means responsive to the development of the stack in alignment with said delivering means for actuating the same.

13. The structure of claim 12 in which said second sprocket means is positioned below said first sprocket means and said fourth sprocket means is positioned above said third sprocket means whereby a generally vertical delivery leg is provided in said chain loop, and means operably associated with said frame responsive to the upward travel of said fourth sprocket means for initiating periodic rotation of said third sprocket means.

14. The structure of claim 13 in which said periodically rotating means is arranged and constructed to operate at at least about twice the speed of the means for rotating said first sprocket means.

15. Apparatus for converting a stream of individual product such as disposable diapers into predetermined count stacks comprising a frame, a first sprocket means journaled in said frame adjacent an introduction path for individual diapers advanced serially in said path, a first carriage mounted on said frame for vertical sliding movement below said first sprocket means and rotatably supporting second sprocket means, a third sprocket means journaled in said frame downstream of said first sprocket means and positioned adjacent a removal path for diaper stacks, a second carriage mounted on said frame for vertical sliding movement above said third sprocket means and rotatably supporting fourth sprocket means, a closed chain loop equipped with individual diaper-supporting finger means entrained on said four sprocket means in generally quadrilateral configuration, resilient means on said frames for each carriage urging the same vertically away from its journaled sprocket means, individual servomotor means for each of said first and third sprocket means, said first sprocket means servomotor means being adapted to operate at a continuous rate so as to position a finger means in said introduction path for each serially advanced diaper, said third sprocket means servomotor means being adapted to operate periodically at a rate faster than said continuous rate so as to position said predetermined number of finger means adjacent said removal path for removal from said finger means when said third sprocket means servomotor means is stopped, pusher means on said frame for pushing a stack of diapers from said predetermined number of finger means upon stopping of said third sprocket means servomotor means provided said predetermined number of finger means has been advanced during the periodic operation of said third sprocket means servomotor means into adjacency relative to said removal path, and switch means on said frame responsive to the movement of said second carriage for regulating the operation of said third sprocket means servomotor means.

16. The apparatus of claim 15 in which delivery belt means are operatively associated with said frame for moving individual diapers in said introduction path, diaper presence sensing means operably associated with said delivery belt means and arranged to control the operation of said first sprocket means servomotor means.

17. The apparatus of claim 16 in which culling means are operably associated with said delivery belt means for diverting unwanted diapers therefrom.

18. The apparatus of claim 17 in which said culling means is responsive to switch means associated with said second carriage to prevent overloading of said chain loop.

19. The apparatus of claim 15 in which the rate differential between said servomotor means is arranged to provide sufficient time for operation of said pusher means to remove a diaper stack from said chain loop.

20. The apparatus of claim 16 in which said switch means include a switch for stopping the periodic operation of said third sprocket means servomotor means short of developing said predetermined count in adjacency to said removal path whenever an inadequate number of diapers is in said chain loop.

* * * * *